United States Patent
Lee et al.

(10) Patent No.: US 7,882,038 B2
(45) Date of Patent: Feb. 1, 2011

(54) VERIFICATION METHOD FOR OPERATION OF ENCRYPTION APPARATUS AND ITS APPLICATION TO ELECTRONIC VOTING

(75) Inventors: Yunho Lee, Gyeonggi-do (KR);
Kwangwoo Lee, Gyeonggi-do (KR);
Seungjoo Kim, Gyeonggi-do (KR);
Dongho Won, Gyeonggi-do (KR)

(73) Assignee: Sungkyunkwan University Foundation for Corporate Collaboration, Suwon, Gyeonggi-Do (KR)

( * ) Notice: Subject to any disclaimer, the term of this patent is extended or adjusted under 35 U.S.C. 154(b) by 894 days.

(21) Appl. No.: 11/708,806

(22) Filed: Feb. 20, 2007

(65) Prior Publication Data

US 2008/0059791 A1 Mar. 6, 2008

(30) Foreign Application Priority Data

Sep. 6, 2006 (KR) .................. 10-2006-0085587

(51) Int. Cl.
*G06Q 20/00* (2006.01)
*G07C 13/00* (2006.01)

(52) U.S. Cl. .................. 705/76; 705/12; 235/50 B; 235/54 C; 235/54 E

(58) Field of Classification Search .................. 705/12, 705/76; 235/51–56
See application file for complete search history.

(56) References Cited

U.S. PATENT DOCUMENTS

| 6,845,447 | B1 * | 1/2005 | Fujioka et al. | 713/156 |
| 7,210,617 | B2 * | 5/2007 | Chaum | 235/51 |
| 2002/0074399 | A1 * | 6/2002 | Hall et al. | 235/386 |
| 2002/0078358 | A1 * | 6/2002 | Neff et al. | 713/176 |
| 2003/0026462 | A1 * | 2/2003 | Chung et al. | 382/119 |
| 2005/0247783 | A1 * | 11/2005 | Poulos et al. | 235/386 |

FOREIGN PATENT DOCUMENTS

| KR | 10-2003-0079844 A | 10/2003 |
| KR | 10-2005-0116050 A | 12/2005 |

(Continued)

OTHER PUBLICATIONS

Mathteachers.com. "Probability." Aug. 23, 2006. All pages. Retrieved via Wayback Machine on Feb. 25, 2010. http://www.mathsteacher.com.au/year10/ch05_probability/04_probability/prob.htm.*

(Continued)

*Primary Examiner*—Evens J Augustin
*Assistant Examiner*—Calvin K Cheung
(74) *Attorney, Agent, or Firm*—Edwards Angell Palmer & Dodge LLP; Kongsik Kim

(57) ABSTRACT

A verification method for encrypter operation and an electronic voting verification system using the same, which can verify the operation of the encrypter without having to execute corresponding decryption. In the verification method, the encrypter creates a plurality of ciphertexts corresponding to the plain text and presenting the ciphertexts to a user. The user selects one of the ciphertexts, the encrypter dispenses a certificate where information used by the encrypter during encryption is recorded, in response to the ciphertexts which are not selected by the user; and the user creates a ciphertext in person and verifies whether or not the user-created ciphertext is identical with the user-selected ciphertext. Then, the user can verify the encryption results inside and outside a polling booth.

4 Claims, 7 Drawing Sheets

FOREIGN PATENT DOCUMENTS

WO    WO2005/093671 A2 * 10/2005

OTHER PUBLICATIONS

Lee et. al. "Towards Trustworkdy e-Voting using Paper Receipts." 2006. All pages. CiteSeer. Retrieved Feb. 25, 2010.*

Lee et. al. "Protection Profile for e-voting systems." 2006. All pages. Sungkyunkwan University. Retrieved Feb. 25, 2010. http://security.re.kr.*

Chaum, D. "Secret-Ballot Receipts: True Voter-Verifiable Elections." IEEE Security & Privacy Jan./Feb. 2004, p. 38-47.*

Ishida et. al. "Divisible Voting Scheme" All pages. Retrieved Sep. 7, 2010. <http://eprint.iacr.org/2003/074.pdf>.*

Karagiannopoulos et. al. "A Note on a Secure Voting System on a Public Network" All pages. Retreived Sep. 7, 2010. <http://onlinelibrary.wiley.com/doi/10.1002/net.20006/pdf>.*

Foulle et. al. "Threat Analysis of a Practical Voting Scheme with Receipts" All pages. Retreived Sep. 7, 2010. <http://www.computing.surrey.ac.uk/personal/st/S.Schneider/papers/voteid.pdf>.*

C. Andrew Neff et al.; *"Verifable e-Voting Indisputable electronic elections at polling places"*; Copyright; 2002-2003; Votehere, Inc.

David Chaum; *"Secret-Ballot Receipts: True Voter-Verifiable Elections"*; IEEE Scoiety & Privacy; Jan./Feb. 2004; pp. 38-47.

David Chaum et al.; *"A Practical Voter-Verifiable Election Scheme"*; ESORICS 2005, LNCS 3679, pp. 118-139, 2005.

Rebecca Mercuri; *"A Better Ballot Box"*; IEEE Spectrum; Oct. 2002; pp. 46-50.

David Chaum, et al.; *"A Practical, Voter-verifiable Election Scheme"*; School of Computing Science, University of Newcastle upon Tyne; Technical Report Series CS-TR-880; Dec. 2004.

C. Andrew Neff; DRAFT *"Practical High Certanity Intent Verification for Encrypted Votes"*; Copyright 2004; VoteHere, Inc.; 2004.10.14; pp. 1-24.

Marek Klonowski, et al.; *"A Practical Voting Scheme with Receipts"*; ISC 2005; LNCS 3650; pp. 490-497; 2005.

* cited by examiner

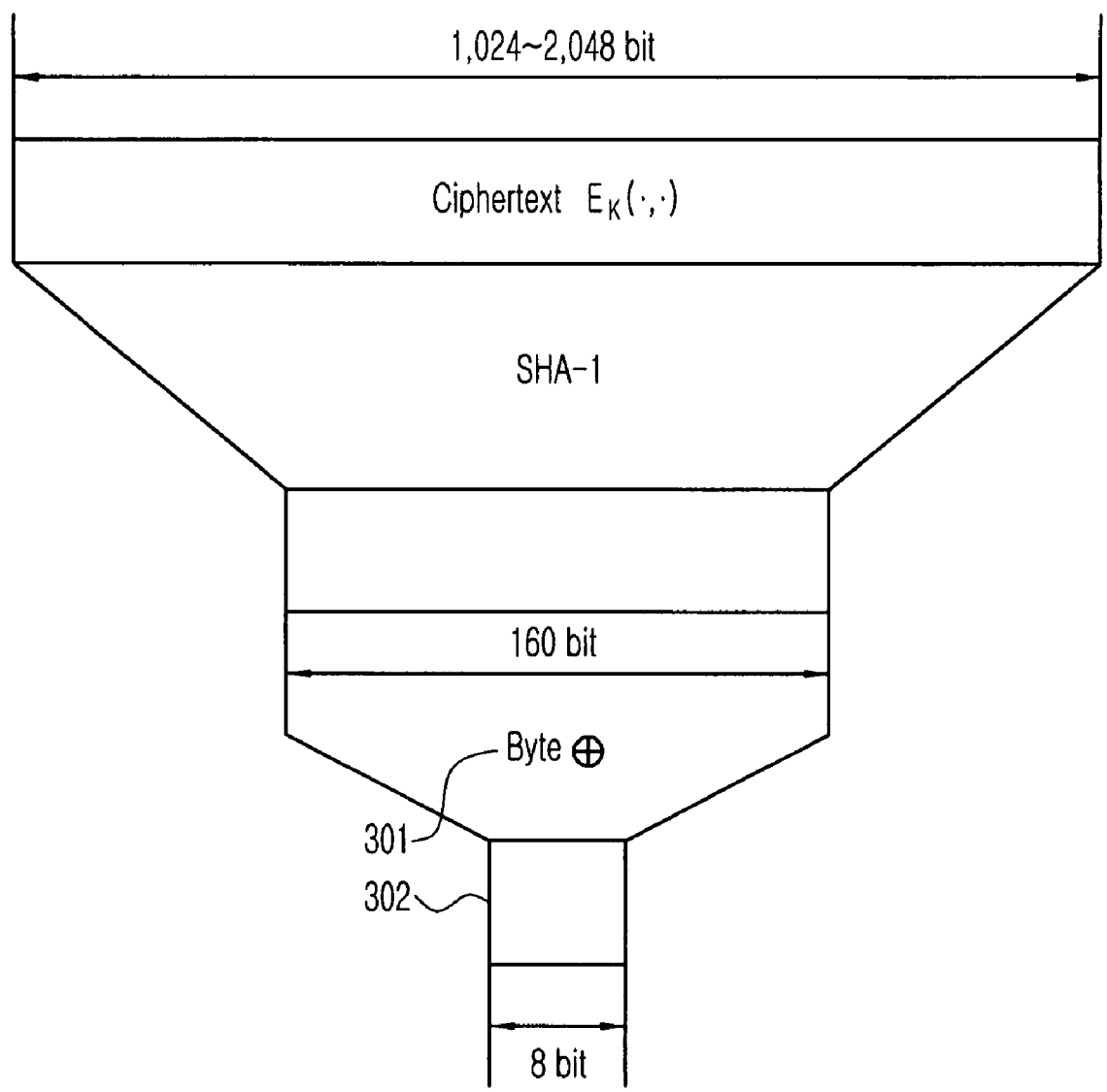

VERIFICATION METHOD FOR OPERATION OF ENCRYPTION APPARATUS AND ITS APPLICATION TO ELECTRONIC VOTING

CROSS-REFERENCE TO RELATED APPLICATION

The present application claims, under 35 U.S.C. §119(a), the benefit of Korean Patent Application No. 10-2006-0085587, filed Sep. 6, 2006, the entire contents of which are hereby incorporated by reference.

BACKGROUND OF THE INVENTION

1. Field of the Invention

The present invention relates to a verification method for encrypter operation and an electronic voting verification system using the same, and more particularly, a method capable of verifying the operation of the encrypter without having to execute a corresponding decryption.

2. Background Art

An electronic voting system allows all voting procedures to be carried out via the Internet, unlike an offline voting system. With the electronic voting system, voters need not visit a polling station, but can participate in voting via the Internet, irrespective of their location. Those who have difficulties in participating in voting, such as the handicapped, can easily exercise their voting rights. Thus, election costs can be reduced greatly. However, for the electronic voting system having the foregoing merits to be used in democratic procedures, it is required for the electronic voting system to be safe from any illegal intervention. An electronic polling system unstable against any attack may cause heavy social confusion since it is to be used by many people. Thus, the electronic voting system requires the highest level of cryptological stability.

The electronic voting system ensures secrecy of votes and anonymity to voters using public key codes while allowing the voters to verify whether or not their votes are reflected in the voting results. The public key codes used are easily applicable, even in a public key based structure and, as not limited to a specific code algorithm, have high applicability to various security policies.

Many studies have been pursued for safe and efficient electronic voting protocols. Examples of such protocols include homomorphic encryption, mix-net, and blind signatures that are devised with cryptological techniques. However, even though requirements for electronic voting are satisfied, very few protocols are efficient in calculation and storage space for a number of voters and realizable in practice. A series of procedures associated with electronic voting are carried out through an encryption process so as to be fair and safe.

In general, encryption techniques are divided into encryption and decryption, and are verified by encryption and decryption. However, there is a requirement of raising reliability in the encryption result in an environment where the encrypter that has carried out encryption is not reliable or decryption cannot be carried out. A representative application field may be the electronic voting system based on the encryption technique. In the electronic voting system using the encryption technique, an electronic voter acts to store ciphertexts made from values selected by users and transfer stored data to a ballot counter.

The ballot counter, upon receiving the encrypted voting values, performs decryption to calculate the voting result. In this case, if the electronic voting system intentionally or unintentionally encrypts values different from those selected by the voters, erroneous voting results are counted. Thus, it is essential to make the voter operate normally as well as verify normal operation.

A voter can verify the operation of the voting system generally according to two methods. As a first method, the voter can decrypt the ciphertext in person to verify whether or not the ciphertext is identical with his/her own selection. A second method is an indirect verification method, by which the voter can be convinced of the correctness of a value encrypted with at least preset probability. However, the first method of direct verification cannot be used in a restricted environment such as electronic voting. Because those keys for decryption are known to a single or several voting management organizations only for the purpose of having a secret ballot, the voter cannot confirm the encrypted voting value by decryption.

For these reasons, the indirect verification method is used to verify the operation of the encrypter in a restricted environment such as electronic voting. As conventional techniques for this purpose, there are an electronic voting method based on visual encryption technique and an incessant verification method using verifiers.

In the method based on visual encryption technique, a text can be read when two transparent sheets are overlapped together but the text cannot be read when the two sheets are separated from each other. A voting machine outputs a selection value of a voter on the two transparent sheets where visual encryption is applied so that the voter can recognize his/her selection value on the sheets overlapped together.

Then, one of the two sheets is selected and then discarded in the voting station, but the other sheet is kept. A ballot counter can decrypt the voting value from the single sheet by using a secret key. In this case, if sheet selection by the voter can be predicted, the voting value can be forged. Thus, the reliability of the voting system is 1/2. This method has drawbacks in that the verification probability is fixed to 1/2 and specific output devices are needed.

In the incessant verification method as the second conventional method, a reliable verifier executes verification in place of voters by using a code book where encrypted voting values for all electorate and candidates are stored previously. That is, the code book contains at least as many encrypted voting values as the total electorate number X the total candidate number which is previously calculated. A voting machine records encrypted voting values according to voter selection with reference to the code book. In this case, the reliable verifier executes voting procedures as if he/she is a voter in order to verify whether or not the code book is correctly referred to.

Since the verifier also has the same code book and thus can verify the operation of the voting machine and the voting machine cannot distinguish the verifier from the voters, it is impossible to perform any unfair operation where code book reference is enabled only when the verifier executes the voting procedures.

That is, the voters execute verification via the verifier, and the reliability of the voting machine is $c/(c+1)$, where 1 is the electorate number and c is the number of verifications.

This method has drawbacks in that the voters should trust the verifier and the number of verifications should be larger than the electorate number to set the verification probability to be 1/2 or more.

Examples of this approach are disclosed in [1] *"Verifiable Electronic Voting Scheme"* (C. A. Neff and J. Adler, http://votehere.com/vhti/documentation/VH_VHTi_WhitePaper-.pdf, VoteHere Inc., 2003), [2] *"Secret Ballot Receipts: True Voter-Verifiable Elections"* (D. Chaum, IEEE Security and Privacy Magazine, vol. 2, no. 1, pages 24-31, 2004), [3] "Voter-Verifiable Election Scheme" (D. Chaum, P. Y. A. Ryan, and S. Schneider, Proc. of 10th European Symposium on Research in Computer Security (ESORICS2005), LNCS 3679, pages 118-139, 2005)", Korean Patent Application Publication No. 2003-0079844 (Oct. 10, 2003), Korean Patent Application Publication No. 2005-0116050 (Dec. 9, 2005) and so on.

That is, document [1] teaches a technique of creating a code book by encrypting all probable voting values of all the electorate in advance to voting, in which verification to normal operation of an electronic voting machine is carried out by a reliable verifier. Document [2] presents a technique of recording electric voting results based on visual encryption, and document [3] discloses a technique which is most similar to the current paper ballot systems and thus education of voting procedures is least required.

In addition, Korean Patent Application Publication No. 2003-0079844 discloses an electronic voting system as shown in FIG. 1. The electronic voting system includes a central system 10 storing an electorate list and candidate information in a database, a plurality of voting station systems 20 storing information corresponding to voting places in a database, a plurality of ballot counting systems 30 connected with the voting station systems 20 to execute ballot counting and transmitting counting results to the central system 10 and a number of electronic voting machines. Each of the electronic voting machines includes a voting number dispenser connected to a corresponding one of the voting station systems 20 and acts to output bar codes or punch cards which the voting machine can read automatically, a device connected to the voting station system 20 and capable of reading a voting number outputted from the voting number dispenser, user-selectable push buttons, a display screen for identifying user selection, a printer for outputting a balloting result as a print and a memory for storing each balloting result as data therein. Referring to FIG. 1, the reference sign 50 indicates the electronic voting machine in use for user selection, 60 indicates the printer for outputting the balloting result, and 70 indicates a public broadcasting network.

Korean Patent Application Publication No. 2005-0116050 discloses an electronic voting system as shown in FIG. 2. The electronic voting system includes a voting management server 700 and a ballot counting management server 720. The voting management server 700 generates voting management random numbers corresponding to an electorate list (user DB) and the total electorate number, and receives tickets decrypted from encrypted tickets CT, which are transmitted from a voter terminal 740 from the ballot counting management server 720, and encrypted voting values xi from the voter terminal 740, in which the encrypted voting values xi are produced, by public keys of the ballot counting management server 720, from voting selection v inputted from voters and ballot counting verification passwords r. Then, the voting management server 700 stores and arranges the tickets and the encrypted voting values xi in ballot boxes. The ballot counting management server 720 generates ballot counting management random numbers corresponding to the total electorate number, transmits the encrypted tickets CT to the voter terminal 740, re-arranges the ballot boxes received from the voting management, decrypts the voting values xi stored in the ballot boxes using secret keys of the ballot counting management server 720 to sum up voting results, and publish the voting results and the ballot counting verification passwords.

In FIG. 2, the voting management server 700 includes a generator 701 for generating the electorate list and the voting management random numbers, the memory 702 for storing the encrypted voting values, a transceiver 703 for transmitting/receiving data, a mixer 704 for executing arrangement according to random series, a verifier 703 for verifying the correctness of data and a publisher 706 for publishing the total electorate number. In addition, the ballot counting management sever 720 includes a generator for generating ballot counting management random numbers, a memory 722 for storing voting close confirmation codes EC, a transceiver 723 for transmitting/receiving data, a mixer 724 for rearranging the ballot boxes, a verifier for verifying the correctness of the data 725 and a publisher 726 for publishing the voting results and the ballot counting verification passwords.

However, those approaches disclosed in the foregoing documents have some problems in that the verifier for verifying the electronic voting machine should be trusted, the special printer for outputting certificates is needed, verification probability fixed to each voter cannot provide a high value, the ballot paper recorded with a ciphertext should be manufactured in advance, and the verifier for verifying the ballot paper in the voting station should be trusted.

In those approaches disclosed in foregoing Korean Patent Publications, the electronic voting machine may forge voting results and thus a measure for verifying the electronic voting machine is essentially needed.

In addition, in a situation where a voter cannot execute a decrypting operation, an indirect verification method capable of entrusting normal operation at a high probability is needed in order to verify a device for executing encryption such as the electronic voting machine.

SUMMARY OF THE INVENTION

Accordingly, the present invention has been made to solve the above-mentioned problems occurring in the prior art, and an object of the present invention is to provide a verification method for encrypter operation and an electronic voting verification system using the same, which can execute verification with a high probability in the assumption that an encrypter such as an electronic voting machine is not trustworthy.

Another object of the invention is to provide a verification method for encrypter operation and an electronic voting verification system using the same, which can promote an approach for indirectly verifying the operation of an encrypter and can be applied to fabrication of an electronic voting machine for carrying out an encrypting operation so that a voter can trust normal operation of the electronic voting machine but cannot prove his/her voting value to others so as to follow the secret voting principle.

As an aspect for accomplishing the foregoing objects, the invention provides a verification method for encrypter operation using an encrypter, a display device and a certificate dispenser to output a probabilistic encryption result in response to a plain text inputted by user selection. The method includes steps of: at the encrypter, creating a plurality of ciphertexts corresponding to the plain text and presenting the ciphertexts to a user; at the user, selecting one of the ciphertexts; dispensing a certificate where information used by the encrypter during encryption is recorded, in response to the ciphertexts which are not selected by the user; and at the user, creating a ciphertext in person and verifying whether or not the user-created ciphertext is identical with the user-selected ciphertext.

In the verification method, the user is allowed to recognize that the user-selected ciphertext corresponds to the plain text even if a decryption key is not recognized.

In the verification method, the user and the encrypter have an encryption key but do not have the decryption key.

In the verification method, the user comprises a plurality of users, and the plain text has a limited space shared by the users and the encrypter.

In the verification method, the encrypter has a verification probability p, satisfying the condition: $2^{-1} \leq p < 1$.

As another aspect for accomplishing the foregoing objects, the invention provides an electronic voting verification method. The electronic voting verification method includes steps of: (a) at an encrypter, generating at least two ciphertexts for all plain texts in a limited plain space and displaying the ciphertexts on a screen; (b) at a user, selecting one for each of the plain texts from the ciphertexts; (c) outputting a certificate where some of the ciphertexts unselected in step (b) and encryption information used by the encrypter in the generation of the unselected ciphertexts are recorded; (d) at the user, selecting one of the user-selected ciphertexts; and (e) at the encrypter, dispensing a certificate where the ciphertext selected by the user in step (d) is recorded, wherein the user is able to verify in person whether or not his/her opinion is forged while both secrecy of voting results and anonymity of voters are ensured based on public key passwords.

The verification method may further comprise: (f) outputting a certificate where the ciphertexts for all the plain texts in the limited plain text space are recorded in random order prior to being selected by the user; and (g) reducing the ciphertexts to be outputted on the certificate by using a reduction function for outputting a shorter length of character strings from a longer length of character strings.

As a further aspect for accomplishing the foregoing objects, the invention provides an electronic voting verification method using an encrypter, which includes a screen display unit and a printer. The electronic voting verification method includes the steps of: (a) at a central management organization, determining a public key as a public parameter for encryption; (b) at an encrypter, encrypting 1 to n numbers t times each, using the public key and a random generator; (c) binding encryption values into N number of groups and displaying the encryption values on a screen; (d) at a user, randomly selecting one of the encryption values from each of the groups; (e) at the encrypter, outputting a certificate where the remaining encryption values except for the selected encryption values and random numbers corresponding to the remaining encryption values are recorded, via the printer to the user; (f) at the user, confirming whether or not the output encryption values are identical with the encryption values displayed on the screen in step (c); (g) at the user, selecting one of n number of encryption values selected in step (d); (h) outputting a certificate where the encryption value selected in step (g) is recorded to the user; (i) at the user, confirming whether or not the output encryption value is identical with that displayed on the screen in step (c); and (j) at the user, verifying an operation for all i's, where $1 \leq i \leq n$, using the encryption values and the random values received in step (e), wherein anybody is allowed to see the printer output values but only the user is allowed to see the screen-displayed values.

As yet another aspect for accomplishing the foregoing objects, the invention provides an electronic voting verification system, which includes: an encrypter including an encrypting operator and a random number generator; a screen display unit for displaying at least two ciphertexts on a screen, the ciphertexts generated by the encrypter for all plain texts in a limited plain text space; a first selector for selecting one for each of the plain texts from the ciphertexts displayed on the screen display unit; a second selector selecting one from the user-selected ciphertexts; and a certificate dispenser for dispensing a certificate, where the remaining ciphertexts unselected by the first selector and encryption information used by the encrypter when generating the unselected ciphertexts are recorded, and dispensing a certificate where the ciphertext selected by the second selector is recorded, wherein the user is able to verify in person whether or not his/her opinion is forged while both secrecy of voting results and anonymity of voters is ensured based on public key passwords.

BRIEF DESCRIPTION OF THE DRAWINGS

The above and other objects, features and advantages of the present invention will be more apparent from the following detailed description taken in conjunction with the accompanying drawings, in which:

FIG. 7 is a schematic view illustrating a reduction function $F(\bullet)$.

DETAILED DESCRIPTION OF THE PREFERRED EMBODIMENTS

Figure 1:
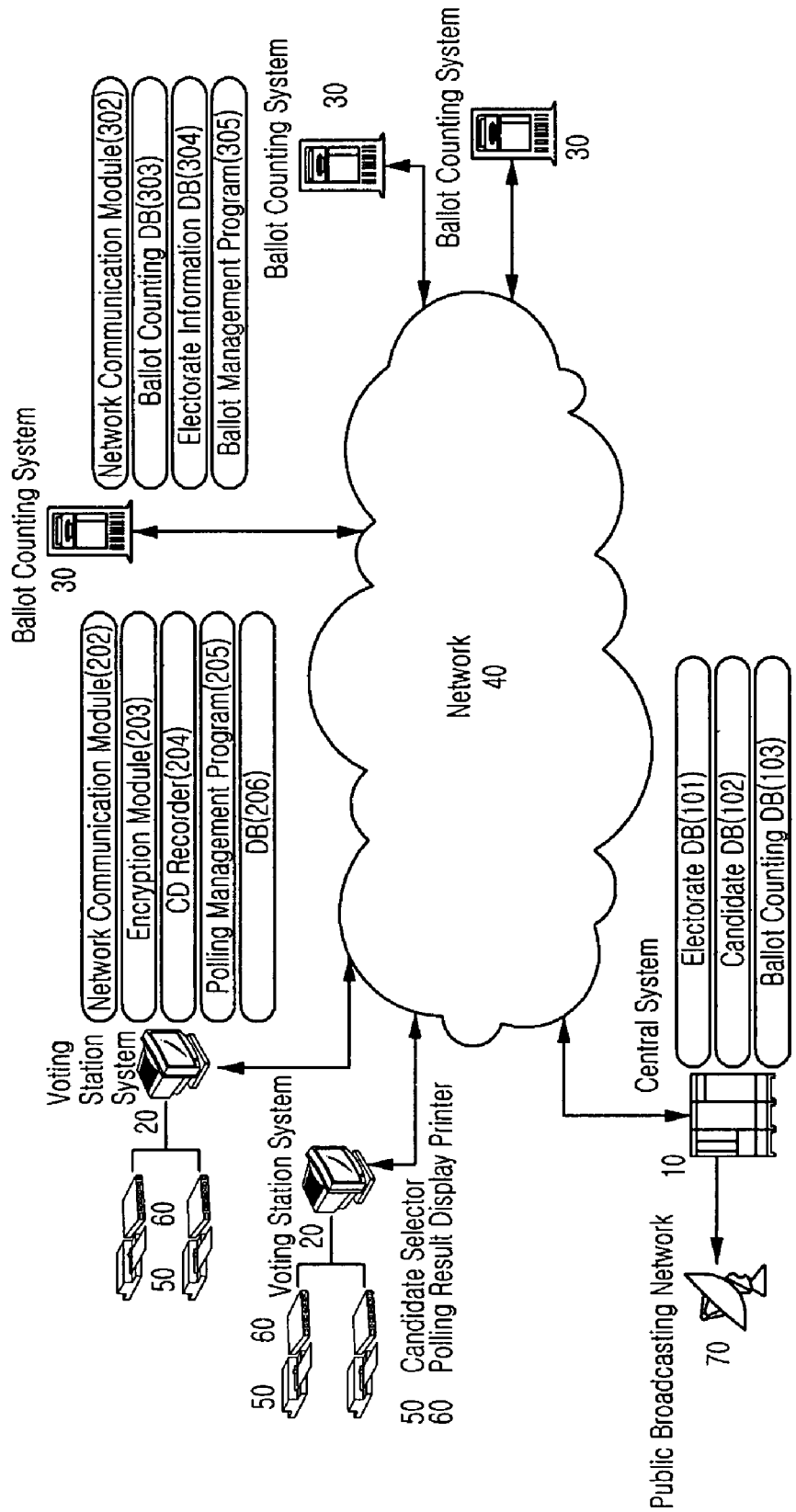
FIG. 1 is a schematic view illustrating an example of a conventional electronic voting system.
Figure 2:
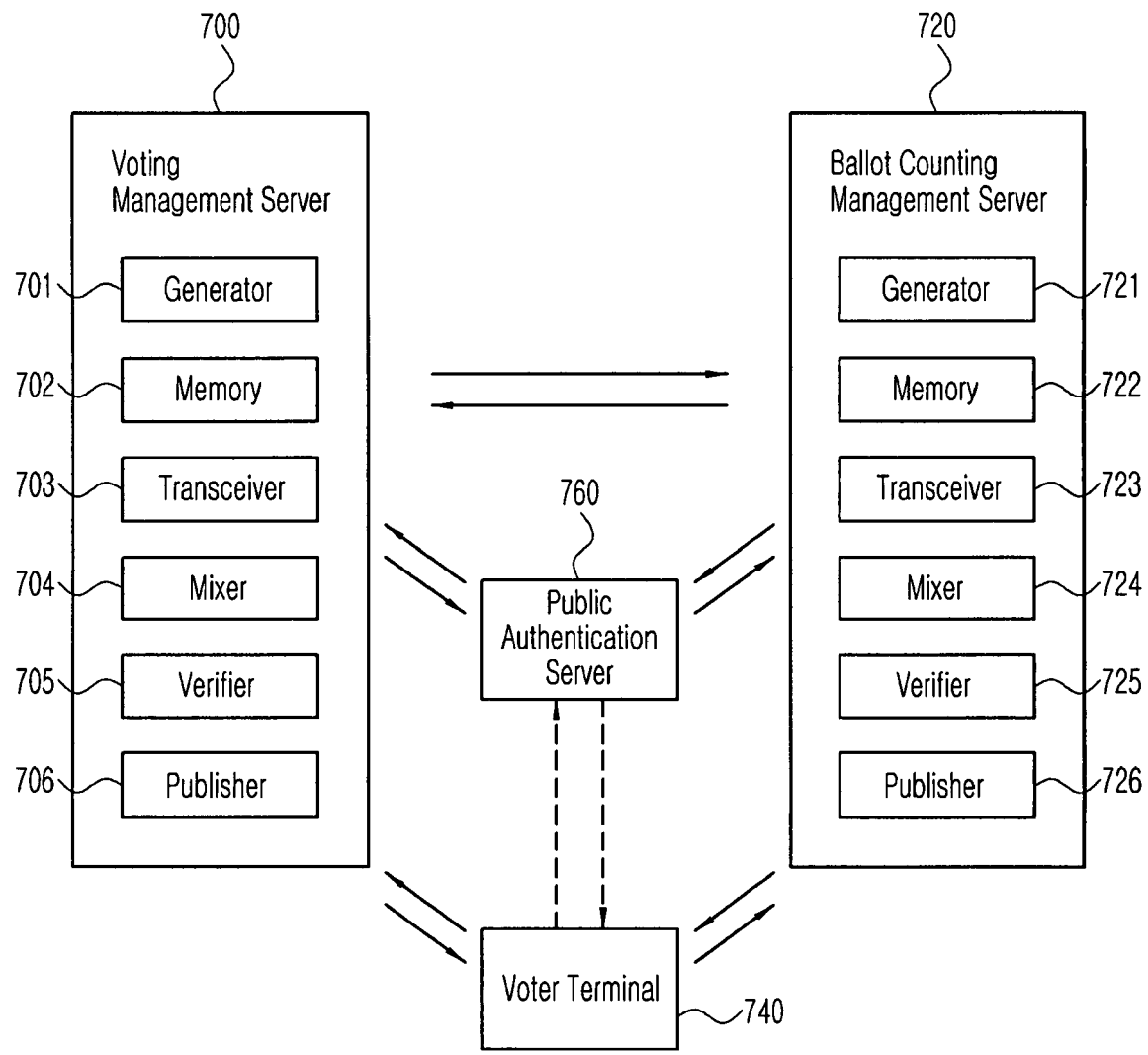
FIG. 2 is a schematic view illustrating another example of a conventional electric voting system.

The concept of the invention will now be described first.

As a method for verifying encrypter operation in a restricted environment such as electronic polling, the invention seeks three (3) technical features as follows:

1. Encrypter verification probability should be 1/2 or more.
2. It is required that verification can be exercised by a user (voter) in person, not by proxy.
3. Special verification equipment should not be required.

In the case of the verification probability, the probability of an encrypter to operate normally should be 1/2 or more. That is, the reliable probability p is in a range $2^{-1} \leq p < 1$. It is required that this probability can be adjusted by using a cryptological stability parameter.

For the verification of encrypter operation, the encrypter has to prove that it correctly encrypted a user-selected value and thus the user should be able to execute re-verification at any time. However, verification via decryption is not allowed.

Users should not request special devices for verification of the encrypter or reliability for other human resources and material resources (software or hardware established by others). That is, the users should be able to execute verification by realizing software or hardware in person.

Hereinafter the present invention will be described with reference to the drawings, in which the same or like reference signs will be used to designate the same or like components, description of which will be not be repeated.

The description of the invention will use the following notation and definitions:

A: Central Management Organization
D: Unreliable Encrypter
V: User of Encrypter $E_K(m, r)$: Probabilistic encrypting operation for encrypting an input value m using a public key K and a random number r, which satisfies a relation $E_K(m, r_1) \neq E_K(m, r_2)$ if $r_1 \neq r_2$. This corresponds to an ElGamal encryption scheme.

$E_{K'}^{-1}(c)$: Operation for decrypting an input value c using a private key K' corresponding to the public key K, which satisfies an equation $E_{K'}^{-1}(E_K(m, r)) = m$.

t: Stability parameter ($2 \leq t$)

The verification method of the invention will now be described.

When D executes an encryption process for m randomly inputted from V, the verification process for the encryption process will be as follows:

1. A determines a public key K as a public parameter for an encrypting operation.

2. V selects an input value m and sends it to D.

3. D generates t number of ciphertexts for the input value m using the public key K and t number of random numbers, and presents the result $c_1, \ldots, c_t$ to V, according to Equation (1) below:

$$c_1 = E_K(m, r_1), c_2 = E_K(m, r_2), \ldots, c_t = E_K(m, r_5) \quad (1)$$

4. V selects $v (1 \leq v \leq t)$ at his/her discretion.

5. D outputs random numbers $r_i$ ($1 \leq i \leq t$, $i \neq v$) used for t−1 number of encryption values except for $c_v$ in order to prove its encryption.

6. V executes an encrypting operation $c'_i = E(m, r_i)$, (i=1, ... t, i≠v) using the random numbers presented by D and verifies $ci=c'i (i \neq v)$ for all i's where i=1, ... t.

Figure 3:
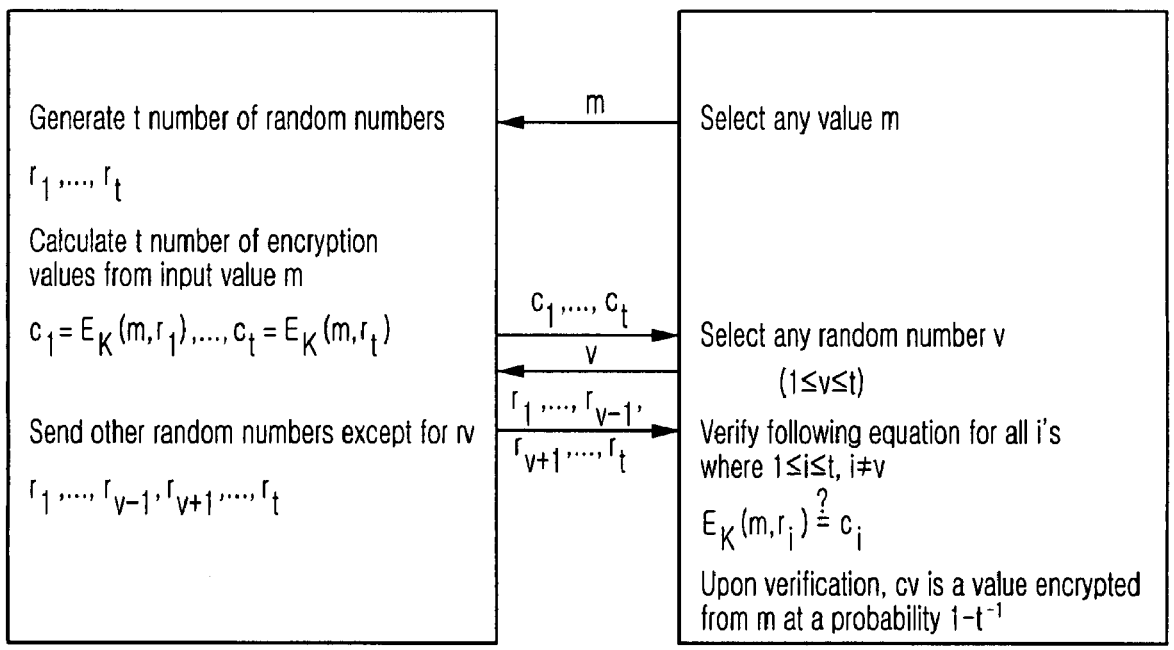
FIG. 3 is a view illustrating an operation verification process for an encrypter according to the invention.

This process is illustrated in FIG. 3, which is a view illustrating an operation verification process for an encrypter according to the invention.

If all of $c_i$ and $c'_i$ are identical, the user V can be convinced that $c_v$ is the encryption value for m at a probability $1-t^{-1}$ without having to decrypt $c_v$. On the other hand, any probability for D to send an encryption result of any value m' (m'≠m) to v without being detected will be obtained by expecting v to be selected by V according to a calculation as in Equation (2) below:

$$c_i = \begin{cases} E_K(m, r_i), & (i \neq v) \\ E_K(m', r_i), & (i = v) \end{cases} \quad (2)$$

In this case, v should be expected correctly and thus the probability is $t^{-1}$.

Accordingly, the probability for V to trust that the selected $c_i$ is an encryption value of m is $1-t^{-1}$. It should be appreciated that not only V but also others can trust the result if the same proving process is shown.

In some cases, however, it is necessary for V not to allow others to trust the encryption by D even though V can trust the encryption by D with a high probability. On the assumption that values selectable by V are in a limited range $1 \leq m \leq n$, and D has a screen display unit and a printer, in which anybody can see a printer output but only V can see a screen display, a proving process modified for this purpose is as follows:

1. A determines a public key K as a public parameter for encryption.

2. D encrypts 1st to nth numbers t times using the public key K and a random number generator according to Equation (3) below:

$$c_{11} = E_K(1, r_{11}), c_{12} = E_K(1, r_{12}), \ldots, c_{1t} = E_K(1, r_{1t}) \quad (3)$$
$$c_{21} = E_K(2, r_{21}), c_{22} = E_K(2, r_{22}), \ldots, c_{2t} = E_K(2, r_{2t})$$
$$\vdots$$
$$c_{n1} = E_K(2, r_{n1}), c_{n2} = E_K(n, r_{n2}), \ldots, c_{nt} = E_K(n, r_{nt})$$

Encryption results are displayed on a screen, bound to N number of groups $G_1$ to $G_n$ according to Equation (4) below:

$$G_1 = \{c_{11}, c_{12}, \ldots, c_{1t}\} \quad (4)$$
$$G_2 = \{c_{21}, c_{22}, \ldots, c_{2t}\}$$
$$\vdots$$
$$G_n = \{c_{n1}, c_{n2}, \ldots, c_{nt}\}$$

3. V selects one encryption value $c_{1s1}, C_{2s2}, \ldots, c_{nsn}$ from each of the groups $G_1$ to $G_n$, where $s_i$ for $1 \leq i \leq n$ is selected by V at discretion in a range $1 \leq s_i \leq t$.

4. D outputs a certificate where the remaining encryption values $c_{ij}$, except for the selected value and random numbers $r_{ij}$ for $c_{ij}$, are recorded, and sends the certificate to V, where $1 \leq i \leq n$, $1 \leq j \leq n$ $j \neq s_i$. In this case, V should confirm whether or not the output $c_{ij}$ is identical with that displayed on the screen in the second procedure.

5. V selects one of the n number of encryption values selected in the third procedure. This process is the same as selecting an integer v from 1 to n at one's discretion.

6. D outputs a certificate where the encryption value $c_{vsv}$, selected in the fifth procedure is recorded and sends the certificate to V. In this case, V should confirm whether or not the output $c_{vsv'}$ is identical with that displayed on the screen in the second procedure.

7. V verifies whether or not $E(i, r_{ij})$ is identical with $c_{ij}$ for the range $1 \leq i \leq n$ using $r_{ij}$ and $c_{ij}$ received in the 4th procedure.

Upon completion of the 7th procedure, V can trust that $c_{vsv'}$ is the ciphertext for v at a probability of $1-t^{-(n-1)}$, but others cannot have any confidence that $c_{vsv'}$ is the ciphertext for v even though they see the outputted certificate.

A process of applying the verification method of the invention to electronic voting will now be described.

The present invention can be applied to an electronic voting system based on cryptological techniques, more particularly, to mutual operation between voters and electronic voting machines. The invention applied to the electronic voting system can be used to make the voters trust that the electronic voting machines operate at a high correctness level without errors.

In general, the electronic voting machine uses codes and operations to electrically record a selection of a voter. In this case, it is impossible to find an original value of a generated ciphertext without knowledge of a decryption key. For this reason, the voter cannot be convinced that the encrypted result is the ciphertext of the value selected by himself/herself. Accordingly, the mutual operation between the voter and the electronic voting machine has to satisfy the following two conditions:

Condition 1: The electronic voting machine should give a proof to the voter so that the voter can trust at a high probability that the value selected by him/her is encrypted.

Condition 2: The voter cannot prove his/her selection value to others even if he/she uses the proof presented by the voting machine.

The mutual operation between the voter and the electronic voting machine will be described as follows:

The voting machine has a physical screen display unit and a certificate printer. On the assumption that t=2 and n=4, that is, four (4) candidates, the electronic voting machine generates $G_1$, $G_2$, $G_3$ and $G_4$ as in Table 1 below:

TABLE 1

| | | |
|---|---|---|
| $G_1 =$ | $c_{11} = E(1, r_{11})$ | $c_{12} = E(1, r_{12})$ |
| $G_2 =$ | $c_{21} = E(2, r_{21})$ | $c_{22} = E(1, r_{22})$ |
| $G_3 =$ | $c_{31} = E(3, r_{31})$ | $c_{32} = E(1, r_{32})$ |
| $G_4 =$ | $c_{41} = E(4, r_{41})$ | $c_{42} = E(1, r_{42})$ |

The electronic voting machine D presents $G_1$, $G_2$, $G_3$ and $G_4$ on the screen. The voter V makes a one-by-one selection of encryption values to be used in voting for all $G_i$ where $1 \leq i \leq 4$. When selections are $s_1=1$, $s_2=2$, $s_3=2$ and $s_4=1$, results are as in Table 2 below:

TABLE 2

| | |
|---|---|
| $c_{11} = E(1, r_{11})$ | $c_{12} = E(1, r_{12})$ |
| $c_{21} = E(2, r_{21})$ | $c_{22} = E(1, r_{22})$ |
| $c_{31} = E(3, r_{31})$ | $c_{32} = E(1, r_{32})$ |
| $c_{41} = E(4, r_{41})$ | $c_{42} = E(1, r_{42})$ |

Now, the electronic voting machine prints a certificate, where $c_1$, $c_2$, $c_3$ and $c_4$ unselected by the voter and random numbers $r_{12}$, $r_{21}$, $r_{31}$ and $r_{42}$ corresponding thereto are recorded, and sends the certificate to V. V confirms whether or not the four encryptions recorded on the certificate are identical with those displayed on the screen. Then, V selects one from $c_1$, $c_2$, $c_3$ and $c_4$. This procedure corresponds to a voter's action to select one of the four candidates. If V selected the second candidate, the electronic voting machine D sends a certificate recorded with $c_{22}$ to V, and V confirms whether or not $c_{22}$ recorded on the certificate is identical with his/her selection displayed on the screen. If the output result is identical, the voter leaves a polling booth and executes the following verification procedures of:

Calculating $E(1, r_{12})$ and verifying whether or not a calculation result is the same as $c_{12}$ recorded on the certificate;

Calculating $E(2, r_{21})$ and verifying whether or not a calculation result is the same as $c_{22}$ recorded on the certificate;

Calculating $E(3, r_{31})$ and verifying whether or not a calculation result is the same as $c_{31}$ recorded on the certificate; and Calculating $E(4, r_{42})$ and verifying whether or not a calculation result is the same as $c_{42}$ recorded on the certificate.

Through the above four verifications, the voter V can be convinced that $c_{22}$ is encrypted from 2 at a probability of $1-2^{-3}$, but others who have not seen the screen of the voting machine cannot have any confidence in believing that $c_{22}$ is a ciphertext of 2, even in view of $c_{12}, c_{21}, c_{32}$ and $c_{42}$; $r_{12}, r_{21}, r_{31}$ and $r_{42}$; and $c_{22}$.

Now a method of promoting user convenience will be described.

Since a probabilistic encryption function $E_K(\bullet,\bullet)$ has an output length from 1,024 bits to 2,048 bits, it is not an easy way to compare the ciphertext recorded on the certificate with that displayed on the screen to find whether or not they are identical to each other.

Thus, it is necessary to contract the output values up to 1,024 to 2,048 bits. For this purpose, a cryptologically-safe hash function may be recognized. However, the output length by hash function is 160 bits or more, which is converted into at least 28 characters via Base-64 encoding for the purpose of comparison.

For example, where there are four candidates, Table 3 below shows an example where a representative hash function SHA-1 and Base-64 encoding are applied.

TABLE 3

| | |
|---|---|
| ixK32CE9h4CNbdhlYMBy5i6becA= | ixK32CE9h4CNbdhlYMBy5i6becA= |
| LXk4UN+4FSXc00DWD51uVmLTu+Y= | LXk4UN+4FSXc00DWD51uVmLTu+Y= |
| 74NnPl3GyET3Q3BQzWfKJQYOefU= | 74NnPl3GyET3Q3BQzWFKJQYOefU= |
| QD9UnK2HBrboQMvYdVUBZJKEnkM= | QD9UnK2HBrboQMvYdVUBZJKEnkM= |

The left part of the table indicates those displayed on the screen and the right part indicates those recorded on the certificate. It is not easy to compare the right and left parts together. (In Table 3 above, the 19th characters in line 3 are different.)

Since it is essential to compare whether or not the values on the certificate are identical with those displayed on the screen in order to verify the certificate, the length of character strings to be compared should be reduced as short as possible without impairing stability.

However, the hash function having an output value shorter than 160 bits is not cryptologically safe. Since the probability of obtaining the same result by contracting different values is raised, the probability of the voting machine to forge a voting value is raised accordingly.

On the assumption that t=2 and n=4, a problem that may occur from the reduction function producing a very short output will be described with reference to FIG. 4.

Figure 4:
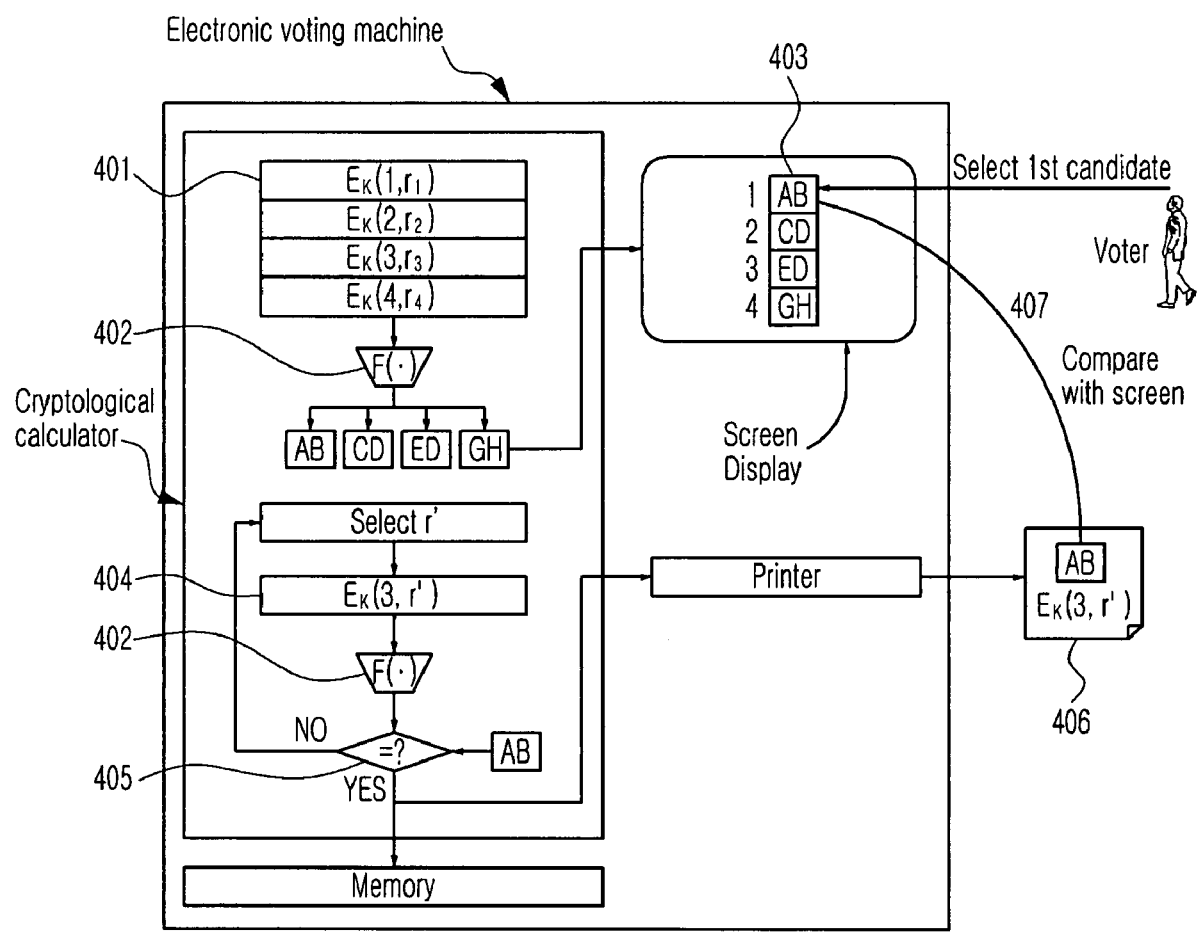
FIG. 4 is a schematic view illustrating a problem where a reduction function $F(\cdot)$ having a short output length is used.

FIG. 4 is a schematic view illustrating a problem where a reduction function $F(\bullet)$ having a short output length is used.

Four ciphertexts 401 to be used in voting, converted into very short character strings through a reduction function 402, are displayed on a screen 403. At this time, it is assumed that the voter selected the first candidate and the voting machine forged the certificate as if the third candidate was selected.

With reference to the contracted character string 'AB' for the first candidate, the voting machine executes encryption while changing random numbers r' until 'AB' is obtained through the encryption of 3 in 405. When r' is found, the voting machine outputs a certificate where E(3, r') and 'AB' are recorded and stores the result in a memory in 406. The voter accepts that E(3, r') is an encryption value of 1 since the output result 'AB' is the same as that displayed on the screen in 407 and the contraction result of E(3, r') is 'AB.' Therefore, the voting machine can forge the voting value successfully.

As a solution to reduce the length of the subject character string to be shorter than 160 bits without having to impair stability, it is possible to make the voting machine output a certificate where total ciphertexts are recorded before the voter selects any of the encryption values to be used in voting. In this case, eight ciphertexts are recorded if t is 2 and total candidates are 4.

Then, the voter can confirm whether or not the ciphertexts recorded on the certificate in the course of voting are identical to those previously recorded on the certificate, and thus those procedures of the voting machine to forge the voting values (404 and 405 in FIG. 4) cannot be executed.

Figure 5:
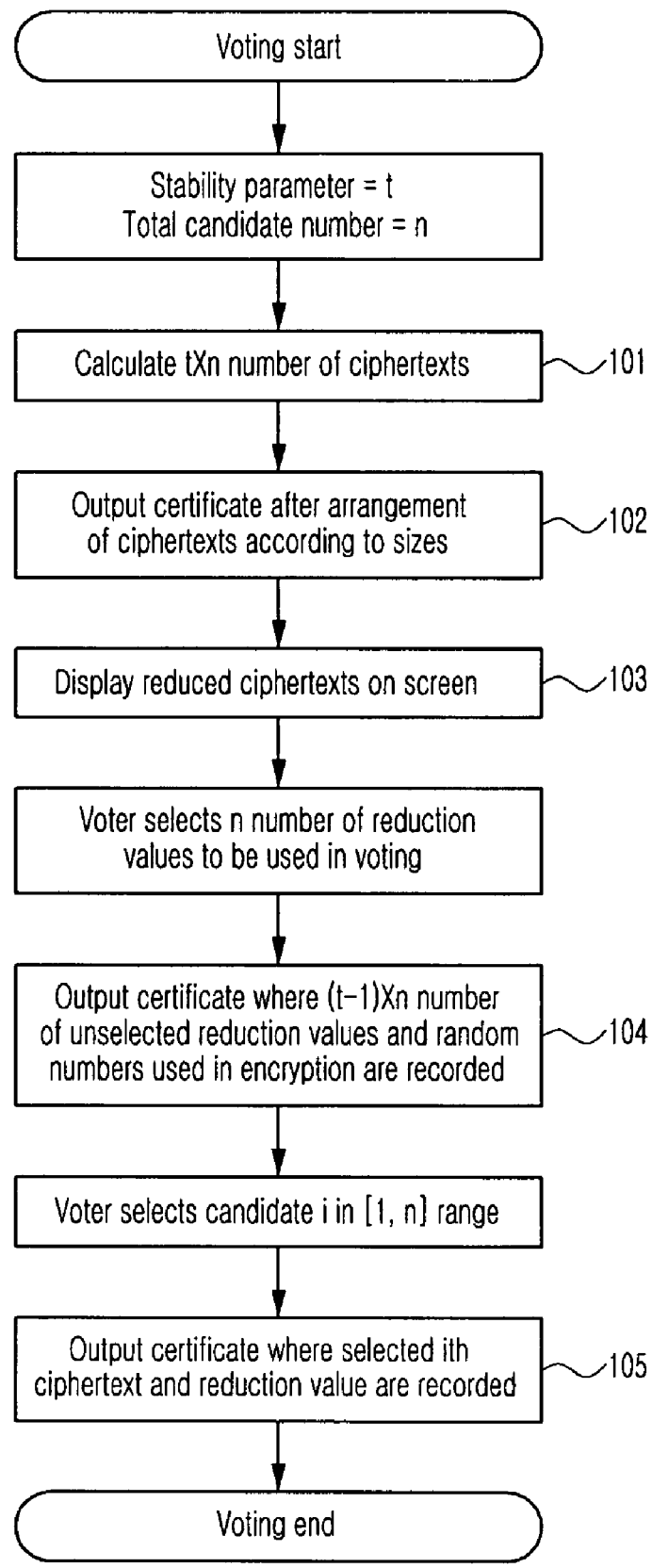
FIG. 5 is a flowchart illustrating an electronic voting process according to the invention.
Figure 6:
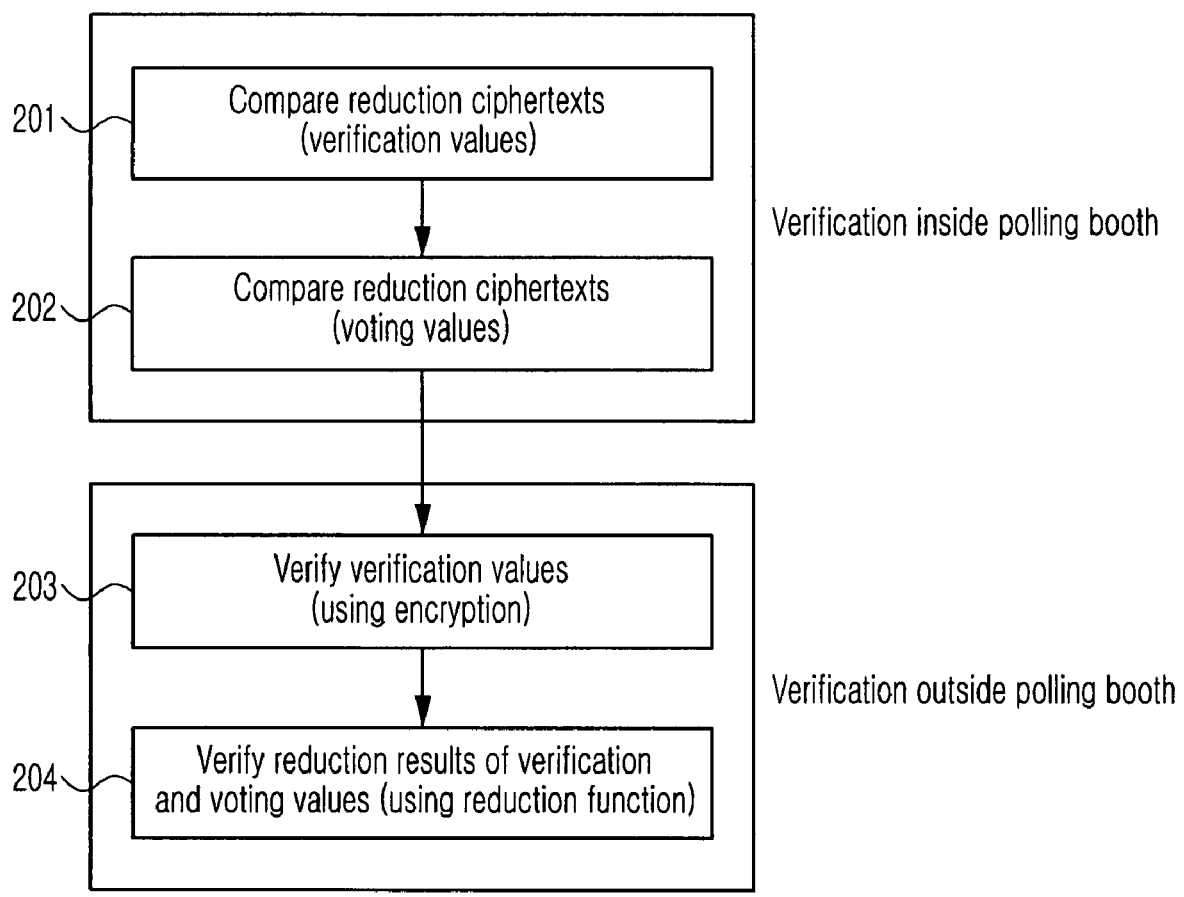
FIG. 6 is a flowchart illustrating a voter verification process according to the invention.

With reference to FIGS. 5 and 6, an execution process of the electronic voting machine and a verification process of the voter will be described, in which user convenience is improved without having to impair stability.

FIG. 5 is a flowchart illustrating an electronic voting process according to the invention, and FIG. 6 is a flowchart illustrating a voter verification process according to the invention.

For stability parameter t and total candidate number n, the voting machine calculates t×n number of ciphertexts, expressed by a matrix as below:

$$\begin{bmatrix} E_K(1, r_{11}) & \cdots & E_K(1, r_{1t}) \\ \vdots & \ddots & \vdots \\ E_K(n, r_{n1}) & \cdots & E_K(n, r_{nt}) \end{bmatrix}$$

The voting machine outputs a certificate where all ciphertexts are recorded. In this case, the ciphertexts should be recorded in random order, and the simplest way to mix the ciphertexts is to arrange them according to their sizes when expressed in integers in 102.

The voting machine reduces the ciphertexts using the reduction function and displays the reduction ciphertexts on the screen according to the order of the candidates in 103. The voter selects n number of the reduction ciphertexts to be used in voting, and the voting machine outputs a certificate where n(t−1) unselected reduction ciphertexts are recorded together with random numbers in 104. The voter executes voting by selecting one of the selected n number of reduction ciphertexts. This is the same as selecting one integer from [1, n]. The voting machine outputs a certificate where the ciphertext for the selected candidate and a reduction value thereof are recorded.

The verification of the voter is divided into inside verification and outside verification. In the voting process, all three certificates are outputted, and the verification inside the polling booth is performed using the second and third outputs.

First, it is verified whether or not the reduction ciphertexts recorded on the second and third certificates are identical with those displayed on the screen in 201 and 202. Outside the polling booth, the voter encrypts the random numbers recorded on the second certificate in person to verify whether or not these values are included in the first ciphertext in 203, and reduces the calculated ciphertext to verify whether or not this value is identical with that recorded on the certificate in 204. In addition, it is verified whether or not the ciphertext recorded on the third certificate exists in the first certificate and the reduction values of the ciphertexts are identical in 204.

FIG. 7 is a schematic view illustrating a reduction function $F(\bullet)$, which outputs an 8 bit result from a 1,024 to 2,048 bit input in 302. First, the input is reduced to 160 bits using SHA-1 hash function, which are divided by 8 bits and subjected to X-OR operation in 301. The 8 bit result produced like this should be represented by characters that the voter can easily identify, in which the simplest way is to use a substitute table as Table 4 below:

TABLE 4

4 bit character substitutes table

| Bit string | Substitute character |
|---|---|
| 0000 | GA |
| 0001 | NA |
| 0010 | DA |
| 0011 | RR |
| 0100 | MA |
| 0101 | BA |
| 0110 | SA |
| 0111 | AH |
| 1000 | JA |
| 1001 | CHA |
| 1010 | KA |
| 1011 | TA |
| 1100 | PA |
| 1101 | HA |
| 1110 | GAP |
| 1111 | EUL |

In case of using alphabetic characters, the output length of $F(\bullet)$ is changed to 10 bits and the substitutes table in Table 5 below is used.

TABLE 5

4 bit character substitutes table

| Bit string | Substitute character |
|---|---|
| 00000 | A |
| 00001 | B |
| 00010 | C |
| 00011 | D |
| 00100 | E |
| 00101 | F |
| 00110 | G |
| 00111 | H |
| 01000 | I |
| 01001 | J |
| 01010 | K |
| 01011 | L |
| 01100 | M |
| 01101 | N |
| 01110 | O |
| 01111 | P |
| 10000 | Q |
| 10001 | R |
| 10010 | S |
| 10011 | T |
| 10100 | U |
| 10101 | V |
| 10110 | W |
| 10111 | X |
| 11000 | Y |
| 11001 | Z |
| 11010 | 1 |
| 11011 | 2 |
| 11100 | 3 |
| 11101 | 4 |
| 11110 | 5 |
| 11111 | 6 |

According to the verification method for encrypter operation and the electronic voting verification system as set forth above, the voting machine presents certificates proving it has executed the proper encryption process to the voter so that the voter can verify the certificates inside and outside the polling booth. Thus, the voter can trust that his/her voting is not forged with a very high probability.

Furthermore, thanks to the applicability to the verification method for encrypter operation and the electronic voting verification system, the voter can trust with a very high probability that the electronic voting machine is operating normally but is not allowed to prove his/her voting value to others, which is to follow the secret voting principle.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A verification method for an encryption operation using an encryption apparatus, a display device and a certificate dispenser to output an encryption result in response to a plain text inputted by user selection, the method comprising steps of:

creating using the encryption apparatus a plurality of ciphertexts corresponding to the plain text;

displaying using the display device the ciphertexts to a user;

selecting via the display device one of the ciphertexts;

dispensing a certificate by the certificate dispenser such that information used by the encryption apparatus during encryption is recorded on the certificate, the ciphertexts which are not selected by the user also being recorded on the certificate;

creating a user-generated ciphertext via the display device; and verifying via the display device whether or not the user-generated ciphertext is identical with the user-selected ciphertext;

wherein the encryption apparatus has a verification probability p, satisfying a condition $2 \leq p \leq 1$.

2. The verification method according to claim 1, wherein the user-selected ciphertext is displayed on the display device enabling the user to recognize that the user-selected ciphertext corresponds to the plain text even if a decryption key is not recognized.

3. The verification method according to claim 2, wherein the user and the encryption apparatus have an encryption key but do not have the decryption key.

4. The verification method according to claim 3, wherein the user comprises a plurality of users, and wherein the plain text has a limited space shared by the users and the encryption apparatus.

* * * * *